United States Patent [19]

Pynsky

[11] Patent Number: 4,703,859

[45] Date of Patent: Nov. 3, 1987

[54] APPARATUS AND METHOD FOR TESTING A CAN SEAM

[76] Inventor: Raymond F. Pynsky, 412 Highridge Rd., Barrington, Ill. 60010

[21] Appl. No.: 924,561

[22] Filed: Oct. 29, 1986

[51] Int. Cl.⁴ .............................................. B07C 5/34
[52] U.S. Cl. ................................... 209/597; 198/402
[58] Field of Search ............... 209/597, 934, 651, 653, 209/701, 928; 73/865.8, 432.1, 848; 198/394, 415, 623, 339.1, 463.4, 402, 464.4, 468.5, 472.1, 502.1, 803.11, 805

[56] References Cited

U.S. PATENT DOCUMENTS

| | | | |
|---|---|---|---|
| 2,069,872 | 2/1937 | Burns | 198/394 |
| 2,722,406 | 11/1955 | Kurek | 198/468.5 |
| 2,775,335 | 12/1956 | Simpson | 198/468.5 |
| 3,101,836 | 8/1963 | Roundtree, Jr. | 198/377 |
| 3,195,724 | 7/1965 | Whitacre | 209/597 |
| 3,261,465 | 7/1966 | Haller et al. | 209/597 |
| 3,389,778 | 6/1968 | Kovacs et al. | 198/394 |
| 3,462,001 | 8/1969 | Boyle | 198/415 |
| 3,576,247 | 4/1971 | Caulford | 198/394 |
| 3,722,657 | 3/1973 | Kienle et al. | 198/394 |
| 4,044,891 | 8/1977 | Pynsky | 209/597 |
| 4,364,463 | 12/1982 | Faltus | 198/402 |
| 4,511,044 | 4/1985 | Conner et al. | 209/597 |

FOREIGN PATENT DOCUMENTS 2098565  11/1982  United Kingdom ............... 209/653

Primary Examiner—Stewart J. Levy
Assistant Examiner—Robert R. Raevis

[57] ABSTRACT

A unit for testing a can includes a first unit for testing a first end of a can, and an optional and substantially identical second unit for testing the second end of the same can. The first unit is connected to the second unit by a twister which rotates the can. The conveying apparatus for each unit includes an inside chain and an outside chain moving in opposite directions to make the rotate as it moves past the sensors. A can is rejected if the sensors so indicate.

16 Claims, 10 Drawing Figures

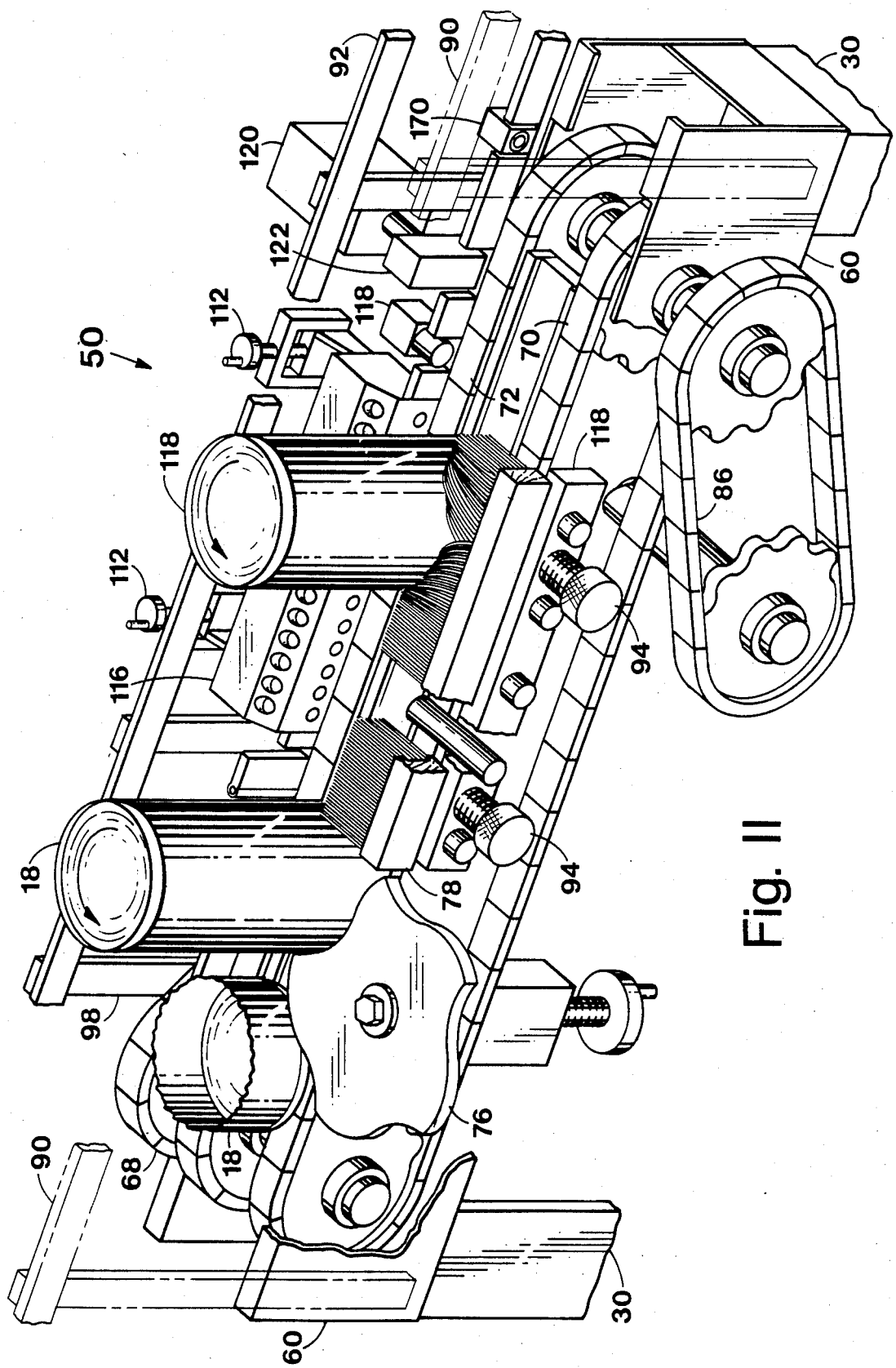
Fig. II

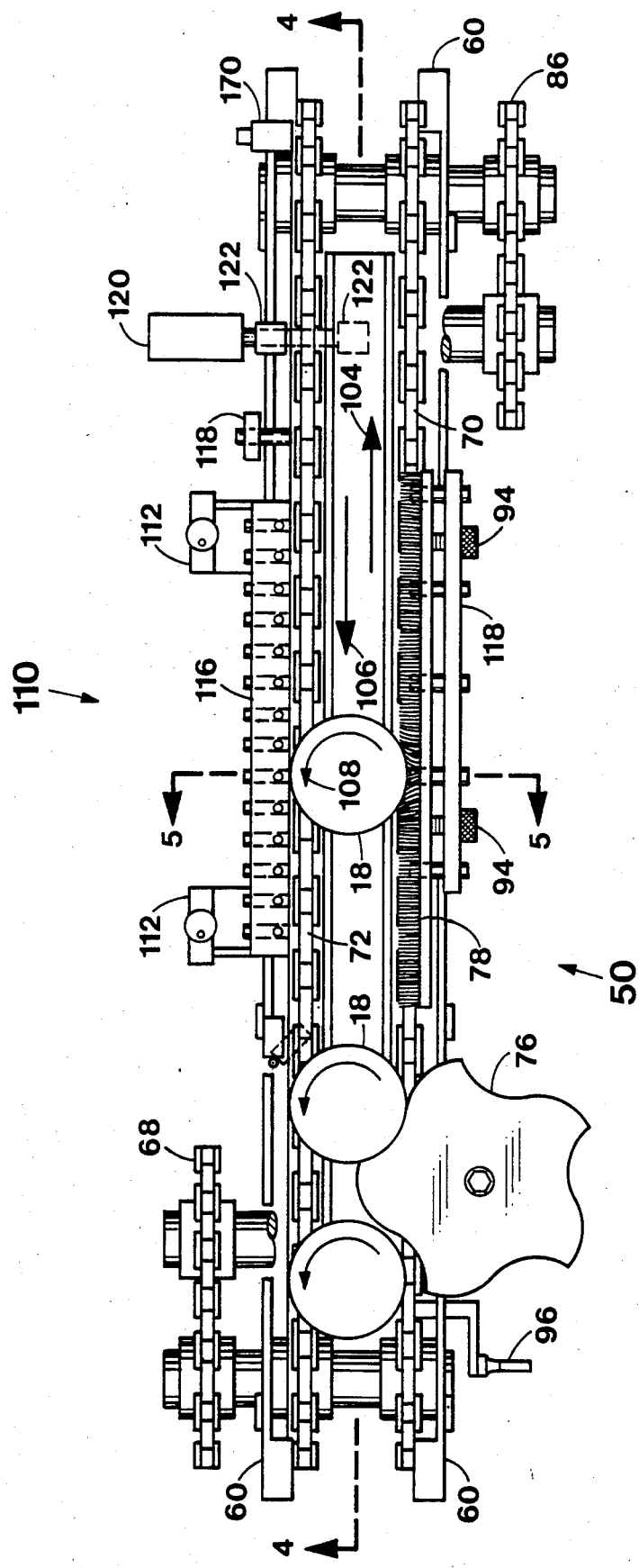
Fig. III

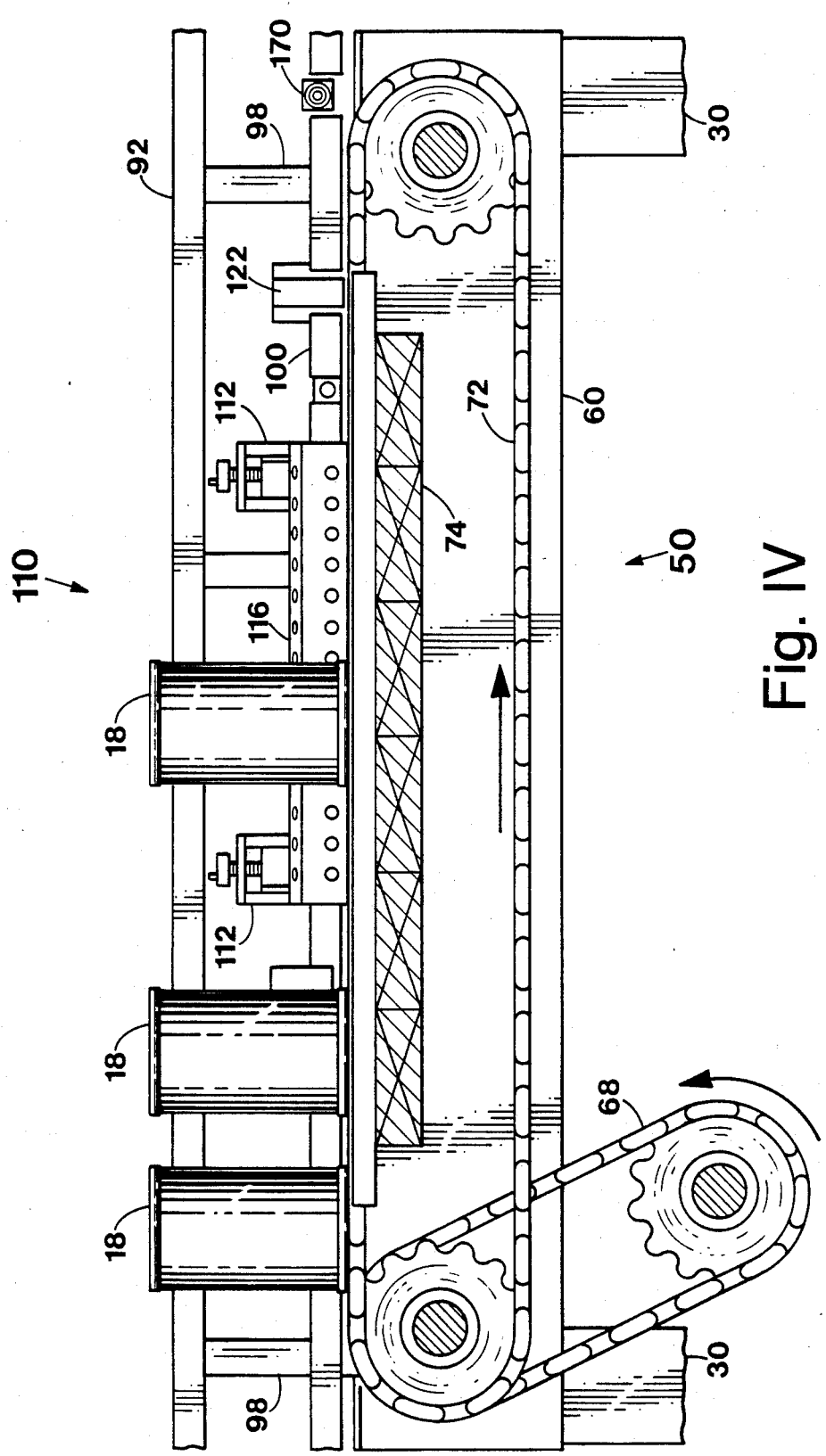
Fig. IV

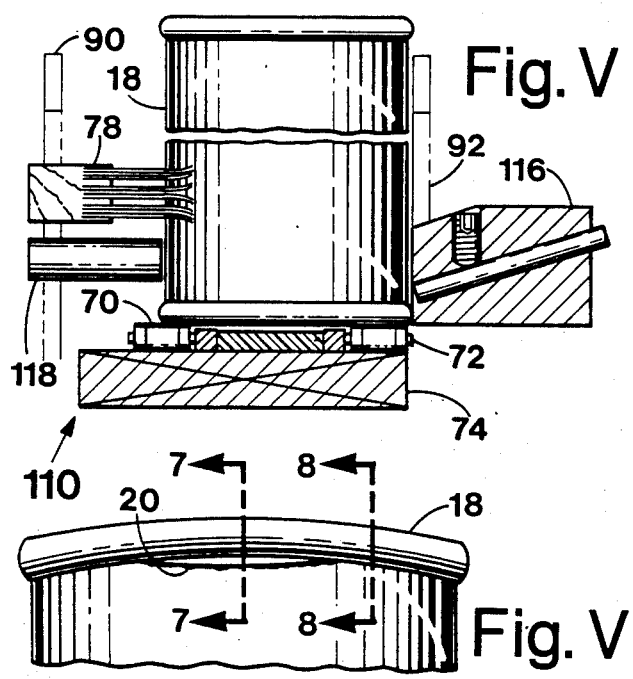
Fig. V
Fig. VI
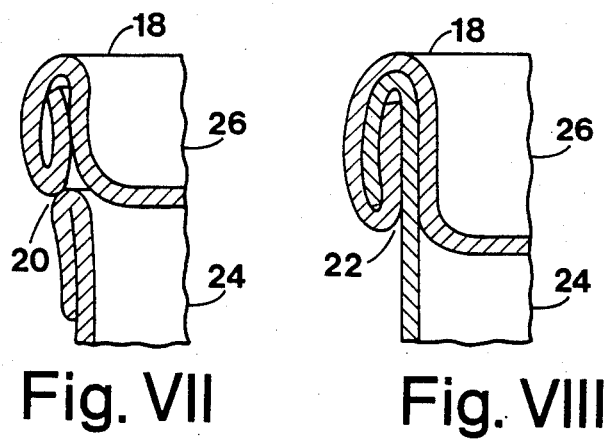
Fig. VII    Fig. VIII
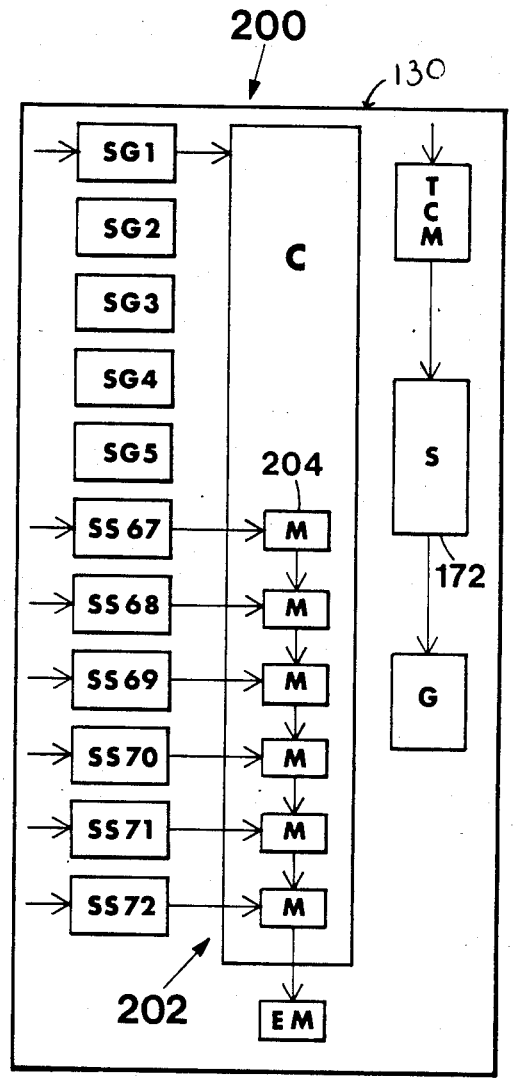
Fig. IX
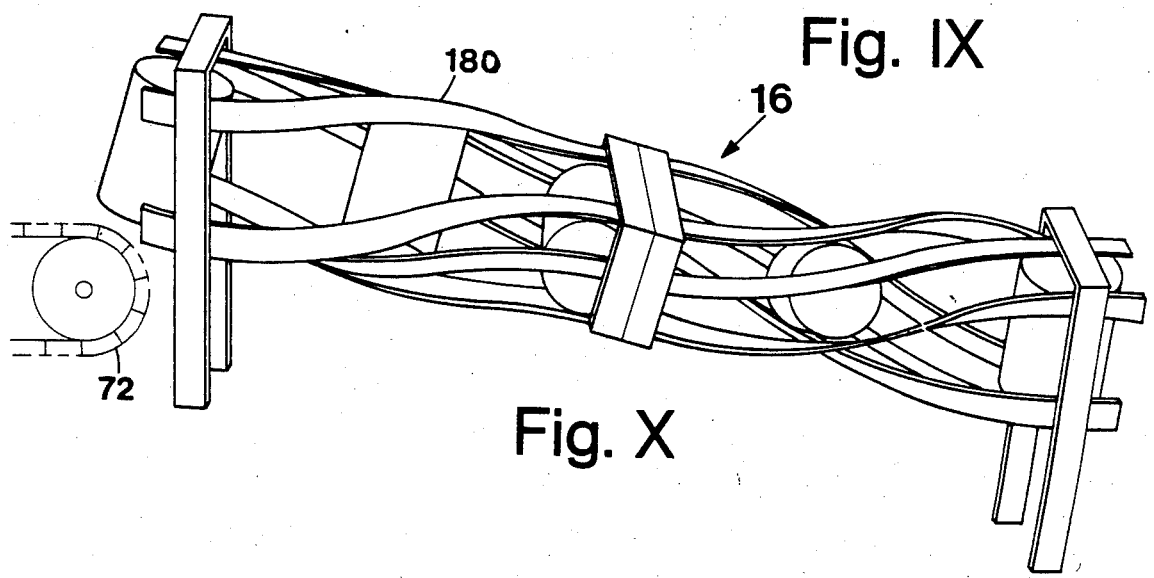
Fig. X

APPARATUS AND METHOD FOR TESTING A CAN SEAM

BACKGROUND OF THE INVENTION

This invention relates to an apparatus and method for testing cans, and more particularly to an apparatus and method for testing a can seam to determine the quality of the seam in the can.

Since Napoleon's army first used canned foods in the early eighteen hundreds, it is clear that cans are an important part of transporting food throughout the world. Because of their importance to the distribution of food, cans are subject to very stringent restrictions and quality control standards. If a can is defective, the food therein can spoil and lose its nutritional usefulness at best. On the other hand, at the worst, if the can is defective, great illness and even death can result to the consumer of the food.

It is, therefore, highly desirable to take all reasonable steps to protect the integrity of the can and the food therein. This is especially true of a can with a seam. The seam must be perfect, in order to avoid problems with the food contained therein.

If there is a defect in the can seam causing an imperfect seam, such an imperfect seam must be detectable. An imperfect seam deviates from a normal can by only a very small amount. This defect can amount to less than a millimeter. Therefore, detection is usually impossible by visual means, because the defect is so minimal that it cannot be detected quickly and accurately by visual means. Yet such a minimal defect can be extremely dangerous and greatly compromise the integrity of the food contained in the can.

Visual detection causes a number of other problems. The visual examination slows production and is only as reliable as the person involved. Accordingly, it is desired to combine the visual means with other means of detecting improper can seams.

If the integrity of the seam for the can is maintained, great problems are avoided. If the seam may be examined and found proper efficiently, the stringent quality control and product purity required for food products can be met. At the same time, speed of production can be maintained.

It is especially desirable if the container can be tested in the normal course of processing without difficulty. It becomes clear that such testing is desirable in order to provide that protection, while at the same time minimizing interference with production.

It is difficult to test both ends of a can at the same time automatically. All cans are not perfect right angle cylinders. Even a slight deviation from this right angle cylinder forbids this dual testing because of a lack of flexibility in the positioning of the testing system. The measurements of a defective can are so small, that even a slight variation in the can prevent successful testing of both can ends. Thus, where both ends of a can are desired to be tested, a problem can result.

High speed production is a basic factor in obtaining the desired goals for food production in this day and age. If the inspection testing process and apparatus is incorporated into the normal flow of production, great advantages can be achieved.

SUMMARY OF THE INVENTION

Therefore, it is an objective of this invention to provide a device for testing a can.

A further objective of this invention is to provide a device for detecting minor, but dangerous, defects in a can seam.

A further objective of this invention is to provide a device for protecting the food within the can.

A still further objective of the invention is to provide a device for maintaining food usefulness.

Yet a further objective of this invention is to provide a device to assist in visual detection of defective can seams.

Also an objective of this invention is to provide a device to improve the reliability of visual detection of defective can seams.

Another objective of this invention is to provide a device to minimize interference with production while providing for efficient inspection.

Still another objective of this invention is to provide a method for testing a can.

Yet another objective of this invention is to provide a method for detecting minor, but dangerous, defects in a can seam.

A further object of this invention is to provide a method for protecting the food within the can.

A still further object of the invention is to provide a method maintaining food usefulness.

Yet a further objective of this invention is to provide a method to assist in visual detection of defective can seams.

Also an objective of this invention is to provide a method to improve the reliability of visual detection of defective can seams.

Another objective of this invention is to provide a device to test both ends of a can.

Still another objective of this invention is to provide a method for testing both ends of a can.

Yet another objective of this invention is to provide a method for detecting minor, but dangerous, defects in a can seam.

These and other objectives (which other objectives become clear by considering the specification and claims as a whole) of this invention are met by providing a can testing unit including a conveyor capable of imparting rotation to a can and an electronic sensing system for checking a can seam, and rejecting a can, which does not comply with computer accuracy required by the sensing system.

BRIEF DESCRIPTION OF THE DRAWINGS

FIG. I depicts a perspective view of a can testing unit 10 including a first end unit 12 joined to a second end unit 14 by twister 16.

FIG. II depicts a close-up, perspective, partially cut-away view of roto-conveyor system 50 and sensing system 110 of can testing unit 10.

Figure 1:
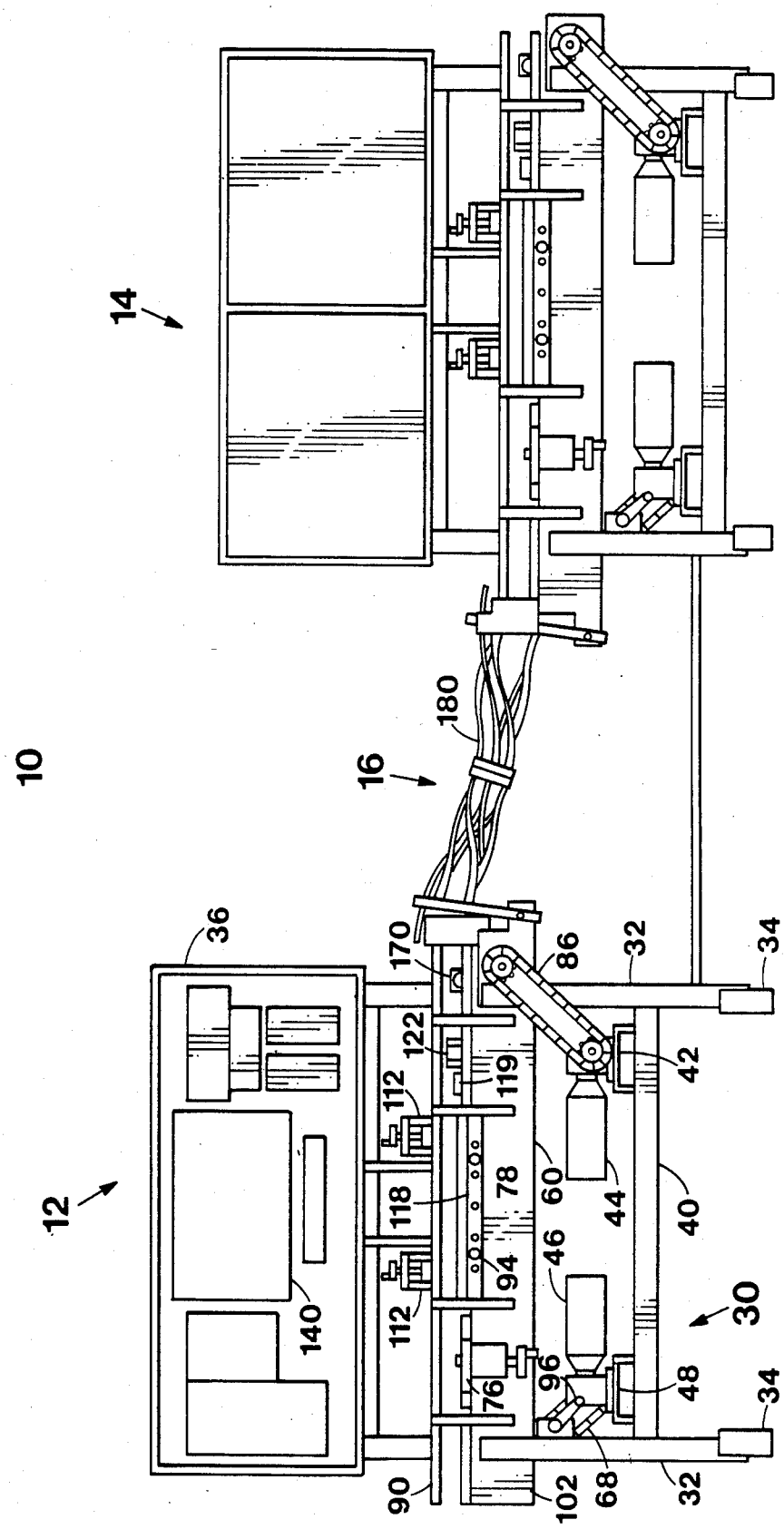

FIG. III depicts a cut-away, top view of sensing system 110.

FIG. IV depicts a cut-away, side view of sensing system 110 taken of figure III along Section Line 4—4.

FIG. V depicts a cut-away, end view of sensing system 110 taken of FIG. III along Section Line 5—5.

FIG. VI depicts a can 18 with a defect 20 therein.

FIG. VII is a first side of a cross-section of FIG. VI along Section Line 7—7 showing a can 18 with a defect 20 in cross-section.

FIG. VIII is a cross-section of a perfect can seam 22 of can 18.

FIG. IX is a block diagram of the circuitry 114 for sensing system 110 to run can testing unit 10.

FIG. X is a close-up view of can twisting unit 16.

Throughout the FIG.s of the drawings where the same part appears in more than one drawing the same number is applied thereto.

DESCRIPTION OF THE PREFERRED EMBODIMENTS

A unit for testing a can includes a first unit for testing a first end of a can and a second unit for testing the second end of the same can. The first unit is connected to the second unit by a twister which rotates the can 180° about its vertical axis into the second unit for testing the second end. The second unit is positioned lower than the first unit so that gravity and the can speed from the first unit into the twister causes the efficient rotation of the can about its horizontal axis, so that the second end of the can is presented to the second unit. If the testing of the second end is unnecessary, the second unit thus becomes unnecessary. Except for the different heights, the second unit and the first unit are substantially identical.

The first unit includes a frame, a platform, a drive support, and a sensing mechanism operably connected to cooperate and form both the first unit and the second unit. The frame supports the platform, the drive support, and the sensing mechanism. The frame includes a platform support for holding the platform and a drive bracket for holding the drive support.

The platform supports the sensing apparatus and a conveying apparatus for moving the can past the sensing apparatus. The conveying apparatus includes an inside chain and an outside chain oppositely disposed from and parallel to the inside chain. The inside chain rotates in a direction opposite to that of the outside chain in contact with an end of the can. For the purpose of causing can rotation so that the entire end of the can is tested, the outside chain has a greater velocity than the inside chain. In this manner, the can is moved passed the sensing apparatus to the rejection apparatus, while it rotates about its vertical axis.

A magnet is situated between the chains to hold the can vertically and downwardly adjacent to the sensing apparatus. The magnet runs at least the length of the sensing system. A brush serves as a side holding apparatus for holding the can close to the sensor horizontally. The magnet, the brush, and the chains cooperate to provide efficient can testing.

The can rejection apparatus is situated adjacent to the sensing apparatus for rejecting a can determined by the sensing apparatus to be unsuitable. The rejection apparatus is electronically connected to the sensing apparatus and activated thereby. After a defective can is tested by the sensing apparatus, the can passes the rejection apparatus and is removed from the production line. Proper or non-defective cans safely pass the rejection apparatus and move on the production process.

The drive support provides a base, on which, the power source for the inside chain and the outside chain can be mounted. The outside chain and inside chain are generally driven by separate power sources. In this fashion, the outside chain may be driven faster and in a direction opposite to that of the inside chain.

DETAILED EXPLANATION OF THE DRAWINGS

FIG. I

Referring now to FIG. I, can testing unit 10 includes a first end unit 12 and a second end unit 14. First end unit 12 is connected to second end unit 12 by twister 16. Twister 16 uses the force of gravity to rotate a can 18 180° degrees about its horizontal axis in order that second end unit 14 may test the end of can 18 that is not tested by first end unit 12.

The reason that both ends are not tested in one unit is the difficulty of spacing each end of a can close enough to a set of sensors for each to achieve the desired results because all cans are not perfect right angle cylinders. Even a slight deviation from the perfect right angle cylinder forbids this dual testing of both can ends at the same time. Thus, where both ends are desired to be tested, twister 16 is used to rotate the can 18 (shown in FIG. II) 180° about its horizontal axis and test the second can end in second end unit 14.

Can 18 is rotated by its momentum in leaving first end unit 12, the structure of twister 16, and the positioning of second end unit 14 relative to first end unit 12. Twister 16 connects first end unit 12 to second end unit 14. Second end unit 14 is substantially a duplicate of first end unit 12 but for the fact that the second end unit 14 is set on a lower level than first end unit 12. This permits the twister 16 to use the force of gravity plus the momentum of the can 18 off of first end unit 12 to rotate the can and feed the can 18 into second end unit 14 to test the other end of the can 18.

Second end unit 14 and first end unit 12 are substantially symmetrical but for the difference in height. Thus, as the description of first end unit 12 and second end unit 14 is continued, it is substantially the same but for a standard adjustment in the length of the legs. Accordingly, first end unit 12 and second end unit 14 are described jointly with the reference basically being to first end unit 12. However, second end unit 14 is numbered in the same fashion as first end unit 12.

Frame 30 for first end unit 12 includes legs 32 with floor mount 34. Frame 30 further includes a control case 36 mounted above a drive support 60. Below drive support 60 is a platform 40 capable of supporting a power source for roto conveyor system 50. Roto conveyor system 50 includes the drive support 60.

Platform 40 includes thereon motor mount 42 secured thereto in a standard fashion. Outer electric motor 44 is secured to outer motor mount 42. Outer motor 44 drives outer block chain 70. Inner motor 46 drives inside chain 72 and is mounted on inner motor mount 48. Inner motor mount 48 is mounted in such a fashion as to drive inside block chain 72 more slowly than outer block chain 70. Inner electric motor 46 and outer electric motor 44 are generally variable speed motors.

The speed of the outer block chain 70 may be 1.5 to 2.5 times the speed of the inside chain 72.

The speed of the outer block chain 70 is generally twice that of the inside chain 72. In this fashion, a can 18 achieves rotation and has the desired results, whether it is accepted or rejected. The can 18 is preferred to rotate twice while an end of the can 18 is exposed to the sensing system 110. In this fashion, an efficient test for a defective can seam 20 is run.

FIG. II

Referring now to FIG. II, a closeup and partial cut away view of roto conveyor system 50 and sensing system 110 is depicted. Roto conveyor system 50 includes drive support 60. Drive support 60 supports inside block chain 72 and outer block chain 70. Motor belt 86 connects outer motor 44 (shown in FIG. I) to outer block chain 70. A similar structure may be seen wherein inner motor 46 also includes a belt 68 capable of driving inside chain 72.

Between inside chain 72 and outer block chain 70 is magnet 74. Magnet 74 holds the can 18 in downwardly directions so that the sensing system 110 can read the edge of can 18 accurately. The can 18 is fed into the sensing system 110 by gate valve 76, which is basically star shaped and has arcs therein to receive the outer edge of the can 18 and space the cans 18 appropriately so that the sensing system 110 is not overloaded.

Can rails include an outer rail 90 and an inner rail 92 capable of positioning the can 18 sufficiently to come in contact with the sensor. Inner rail 92 is adjacent inside chain 72 and outer rail 90 is adjacent outer block chain 70. Thus, can 18 is held appropriately to achieve the desired results. After a can 18 passes gate valve 76, it reaches the sensing system 110. A brush 78 traveling the entire length of the sensing system 110 holds the can 18 adjacent the sensing system 110. The gear drive power source 86 comes of course from inner motor 46 or outer motor 44.

Outer rail 90 is adjustable. Inner rail 92 is fixed. Adjustement of outer rail 92 in order to permit various sizes of cans 18 to pass through the first unit 12 is accomplished by means of locking knobs 94 and rail adjuster 96. Locking knobs 94 position outer rail 90 so that the can 18 may be held appropriately. When knobs 94 are loosened, rail adjuster 96 can be turned and use a standard screw mechanism to move outer rail 90 inwardly or outwardly in order to achieve the desired pressure on the can 18. Outer rail 90 is movable at the adjustable section 102 in order to achieve the desired results.

Sensing system 110 also includes sensing adjusters 112 for the purpose of positioning an inner sensor bank 116 adjacent the can 18 in order to achieve the desired readings. Outer sensor bank 118 is adjacent outer chain 70 and is generally in a fixed position. The fixed position is of course adjustable by the movable section 102 of the outer can rail 90. As the seam 21 between can cylinder 24 and can lid 26 of can 18 passes the sensing system 110, information therefrom is fed by a computer 202 (FIG. IX) network to can ejector 120. If the can seam 21 fails to perform and have the desired parameters, ejector armature 122 receives instructions to push can 18 out of the proper assembly line procedure.

Assuming can 18 passes the sensing test, it proceeds onwardly down the chain through the first end unit 12. At this point, can 18 can enter twister 16 and be forwarded to second end unit 14, if it is desired to test the second and opposing end of can 18. Alternatively if testing of the second end is neither required or desired, can 18 may be sent on to packaging or other handling.

Gate control 170 provides information to computer 202 to control gate valve 76. While any appropriate position may be used therefore, gate control 170 is efficiently located adjacent ejector armature 122, but on the side thereof oppositely disposed from inner sensor bank 116. Readouts from gate control 170 adjust cans 18 passing gate valve 76.

The first end unit 12 is a relatively small unit and adds about three to six feet to the length of the processing unit and may test about four (400) hundred cans a minute. Of course, the number of cans 18 tested can be adjusted to desired parameters. Thus, very efficient means are achieved for testing the appropriate cans 18 at the time desired—with minimal production delay.

FIG. III

Referring now the FIG. III, a top view of roto conveyor system 50 and sensing system 110 is depicted. Can 18 is shown as passing gate valve 76. After can 18 enters roto conveyor system 50, can 18 comes in contact with outer block chain 70 and inner block chain 72.

Because outer chain 70 is moving in direction 104 and inner block chain 72 is moving in direction 106, can 18 rotates counterclockwise in direction 108 because outer chain 70 is moving faster than inner chain 72. If outer chain 70 is moving twice as fast as inner chain 72, can 18 rotates about its circumference (or vertical axis) at least twice as it passes inner sensor bank 116 and outer sensor bank 118. Of course, the directions of outer block chain 70 and inner block chain 72 can be reversed so long as the directions are opposed to achieve the rotation for complete testing.

Inner sensor 116 is adjusted by sensor bank adjusters 112 to be in proper position. As can 18 enters sensing system 110, can 18 comes in contact with brush 78. The effect of brush 78 is to strongly hold can 18 adjacent to inner sensor 116. Brush 78 is adjacent to outer sensor bank 118. In this fashion, an accurate reading of the defect can be seen.

Furthermore, inner motor belt 68 and outer motor belt 86 are clearly shown in this drawing. Inner motor belt 68 drives inner block chain 72. Outer motor belt 86 drives outside chain 70. In this fashion, the rotation and feeding of the can 18 past the ejector 120 in the sensing system is achieved.

Ejector 120, if activated by the inner sensor bank 116 or the outer sensor bank 118, forces can 18 out of the normal processing line. If ejector 120 does not receive information from the sensing system 110, can 18 is permitted to pass on through for further processing.

FIG. IV

Referring now to FIG. IV, FIG. IV is a cross-section of FIG. III along Section Line 4—4—thus providing a side cutaway view of roto conveyor system 50 and sensing system 110. Inside block chain 72 is depicted as is magnet 74. Cans 18 proceed along roto conveyor system 50, over magnet 74 and by inner sensors 116 to ejector armature 122. In this fashion, the side view of the structure of roto conveyor system 50 and sensing system 110 can be seen. Inner sensors 116 are adjustable by sensor adjusters 112.

More clearly seen in this drawing too is inner rail 92. Inner rail 92 includes inner brace 98 in a plurality thereof and an inner rack 100 for supporting the cans 18 in the desired position adjacent the sensor. Thus, the desired positioning of the cans 18 for testing may take place.

FIG. V

FIG. V is a cross-section of FIG. III along Section Line 5—5 in this fashion, brush 78 and outer sensor 118 can be seen along with inner sensor 116 as is desired.

Can 18 is shown as positioned over magnet 74, outer chain 70 and inner chain 72. Brush 78 is adjacent to outer chain 70. Inner chain 72 is adjacent to inner rail 92 and inner sensors 116.

FIG. VI

FIG. VI depicts a closeup edge of can 18. In FIG. VI a defect 20 is depicted at a point in the edge of the can 18. Can top 26 does not properly overlap can cylinder 24 to form can seam 21.

FIG. VII and FIG. VIII

Referring now to FIG. VII, FIG. VII is a cross-section of FIG. VI along Section Line 7—7 designed to show the defect 20 of can seam 21. As can be seen, can cylinder 24 does not meet with can top 26 in the proper overlapping and sealed fashion.

In FIG. VIII, a perfected seam 22 is depicted as can top 26 and can cylinder 24 are shown in proper overlapping fashion on Section Line 8—8. In this fashion, the desired results can be achieved. As can be seen, the improper seal of the can 18 indicates a defect 20 that does activate the sensing system 110. When this defect 20 activates the sensing system 110, rejection of the can 18 occurs. This is especially true because the can 18 generally rotates or spins twice about its vertical axis during its pass through the sensing system 110. In this fashion a double exposure for the seam 21 of can 18 to sensing system 110 is achieved.

FIG. IX

FIG. IX is a block diagram of the sensing electronics 200 used for sensing system 110 in this invention. Sensing electronics 200 include sensing system 110 and sensor banks 130 with electronic connections therebetween. Basically, the SG1 through SG72 series are switches which represent sensor banks 130. Computer 202 receives information from the sensor banks 130. Computer 202 is mounted in a standard fashion in computer case 140 (shown in FIG. I as being standardly secured in in control case 36).

Sensor banks 130 include inner sensor bank 116 and outer sensor bank 118. Inner sensor bank 116 is adjacent inside block chain 72. Outer sensor bank 118 is adjacent outer block chain 70. Basically, sensor banks 130 provide input to the sensing system 110 in control box 140.

This information from sensor banks 130 is fed into memory units 204. The memory units 204 serve to activate the ejector mechanism 120 when the sensor banks 130 indicate the can is defective. Ejector mechanism 120 then activates the ejector rod 122 and ejector armature 164 and forces a defective can 18 out of the production cycle.

The control box 140 depicted in FIG. IX also contains an addition to sensor bank 130 and ejector mechanism 120. The traffic gate control monitor 170 activates gate valve 76 and permits the proper flow of cans 18 passed sensor banks 130. The traffic gate control monitor 170 feeds information to scanner 172 electronically, which in turn, activates gate 76 to regulate the flow of cans 18 into testing unit 10. In this fashion, the desired readouts can be achieved.

FIG. X

FIG. X is a depiction of twister 16. Twister 16 includes a plurality of bars 180 designed to fit at various types of cans 18. The momentum of the cans coming off the first end unit 12 into twister 16 and the lower positioning of second end unit 14 permits the can 18 to flow through twister 16 and be rotated 180° about their vertical axis in order that the second end of the can may be tested. In this fashion, desired results can be achieved.

This application—taken as a whole with the specification, claims, abstract, and drawings—provides sufficient information for a person having ordinary skill in the art to practice the invention disclosed and claimed herein. Any measures necessary to practice this invention are well within the skill of a person having ordinary skill in this art after that person has made a careful study of this disclosure.

Because of this disclosure and solely because of this disclosure, modifications of this method and apparatus can become clear to a person having ordinary skill in this particular art. Such modifications are clearly covered by this disclosure.

What is claimed and sought to be protected by letters Patent by the United States is:

1. A testing unit for use with a production system to test a seam of at least one can selected from the group comprising of an accepted can and a defective can, and for finding said defective can; said testing unit including a frame, a platform support, a drive support, and an electronic sensing assembly operably connected to said frame to thereby cooperate and form said unit, wherein:
    a. said frame supports said drive support between said platform support and said electronic sensing assembly;
    b. said platform support holds at least one power source for supplying motive power to said unit;
    c. said drive support includes a conveying mechanism, an input assembly electronically connected to said electronic sensing assembly, a holding mechanism for holding said at least one can in position to be tested operably connected to cooperate and assist with testing of said at least one can, and a rejecting means for removing said defective can from said production system;
    d. said conveying mechanism includes a feeding means to direct said at least one can into said input assembly of said unit;
    e. said drive support further includes a conveying means for moving said at least one can longitudinally and rotationally past said input assembly;
    f. said conveying mechanism is situated between said feeding means and said rejecting means;
    g. said conveying mechanism includes an inside chain, and an outside chain oppositely disposed from and parallel to said inside chain;
    h. a lower holding means is situated between said inside chain and said outside chain to hold said at least one can in contact with said inside chain and said outside chain;
    i. a side holding means for holding said at least one can adjacent to said input assembly is situated adjacent to said outside chain; and
    j. said lower holding means includes a magnet situated between said inside chain and said outside chain whereby the magnet holds said at least one can in a downward direction so that the sensing assembly can accurately sense the seam of said at least one can;
    k. said inside chain moves in a direction opposite to that of said outside chain, and is oppositely disposed from and parallel to said inside chain;
    l. said inside chain, and said outside chain are in contact with an end of said at least one can;

m. said side holding means includes a brush positioned substantially along the entire length of the input assembly so that the sensing assembly can accurately sense the seam of said at least one can;

n. said rejecting means is situated adjacent to said input assembly and oppositely disposed from said gate valve;

o. said rejecting means serves to reject said defective can when said at least one can is determined by said electronic sensing assembly to be said defective can;

p. said input assembly is activated as said defective can passes thereby and causes information to be fed to said electronic sensing assembly; and q. said testing unit is sequentially arranged so that said at least one can passes from said feeding means to said input assembly, and then to said rejecting means; said rejecting means permitting said defective can to be removed from said production system when said input assembly is activated by said defective can, and said rejecting means permitting said accepted can to remain in said production system.

2. The testing unit of claim 1 wherein:

a. said outside chain has a velocity greater than that of said inside chain, to thereby cause said at least one can to rotate thereby exposing said end to said electronic sensing assembly;

b. said feeding means includes a gate valve to space a first can from a second can for periodic entry of said at least one can into said electronic sensing assembly;

c. said inside chain moves from said electronic sensing assembly to said gate valve; and d. said outside chain moves from said gate valve to said sensing assembly, to thereby cause said at least one can to rotate and move longitudinally, thereby exposing said end of said at least one can to said electronic sensing assembly.

3. The testing unit of claim 2 wherein:

a. said testing unit includes a first unit for testing a first end of said at least one can and a second unit for testing the second end of said at least one can;

b. an inverting means connects said first unit to said second unit and rotates said at least one can 180° about its horizontal axis into said second unit for testing said second end of said at least one can;

c. said second unit is positioned lower than said first unit so that gravity and momentum of said at least one can from said first unit into said inverting means causes efficient rotation of said at least one can about its horizontal axis, so that the second end of said at least one can is tested by said second unit; and d. said second unit is similar to but lower than said first unit.

4. The testing unit of claim 3 wherein:

a. said magnet is situated between said inside chain and said outside chain to hold said at least one can vertically and downwardly adjacent to said electronic sensing assembly; and b. said brush serves as a side holding apparatus for holding said at least one can adjacent to an inner sensor from a horizontal direction.

5. The testing unit of claim 4 wherein:

a. said rejecting means is situated adjacent to said said electronic sensing assembly; and b. said rejecting means includes an arm for pushing said defective can out of said production system for visual inspection.

6. The testing unit of claim 5 wherein;

a. said inverting means includes a plurality of bars shaped in the form of an open tube twister to receive said at least one can at a first tube end thereof from said first unit;

b. said inverting means is connected at a second tube end thereof to said second end unit; and c. said tube twister uses the force of gravity to rotate said can 180° degrees about its horizontal axis in order that said second end unit may test an end of said at least one can.

7. The testing unit of claim 6 wherein:

a. said frame includes an adjustable floor mounting system for adjusting height on said first end unit and said second first end unit;

b. said frame further includes a control case mounted above said drive support; and c. said frame further includes said platform mounted below said drive support.

8. The testing unit of claim 7 wherein:

a. said platform includes an outer motor and an inner motor secured thereto;

b. said outer motor is operably connected to drive said outside chain;

c. said inner motor is operably connected to drive said inside chain; and d. said outside chain has a speed of about 1.5 to 2.5 times that of said inside chain.

9. The testing unit of claim 8 wherein:

a. an outer motor belt operably connects said outer motor said to said outside chain;

b. an inner motor belt operably connects said inner motor said to said inside chain;

c. said gate valve is star-shaped; and d. said star-shaped gate valve has at least one aro in an edge thereof to receive said at least one can, and direct said at least one can through said input assembly.

10. The testing unit of claim 9 wherein:

a. said holding mechanism to position said at least one can for said input assembly includes an outer rail and an inner rail, said outer rail being oppositely disposed from said inner rail;

b. said outer rail is adjacent to outside chain;

c. said inner rail is adjacent to inside chain;

d. said outer rail includes an outer rail adjusting means; and e. said inner rail is fixed.

11. The testing unit of claim 10 wherein:

a. said outer rail adjusting means includes a locking means and a rail adjusting means;

b. said rail adjusting means requires release of said locking means to be adjusted properly and setting of said locking means to fix said adjusting means;

c. said input assembly includes an inner sensor bank adjacent said inside chain;

d. said input assembly includes an outer sensor bank adjacent said outside chain;

e. said inner sensor bank includes a sensor adjusting means for positioning said inner sensor sensor bank adjacent to said can; and f. said rail adjusting means serves to position said can adjacent said outer sensor bank.

12. The testing unit of claim 11 wherein:

a. said input assembly is electronically connected to said electronic sensing assembly and a computer contained therein capable of interpreting data and activating said rejecting means;
b. said gate valve positions said at least one can to be read by said sensors;
c. said rejecting means is selectively activated to reject said defective can.

13. A testing unit for finding a defect in at least one can to thereby locate a defective can during a production system and eliminate said defective can from said production system; and testing unit including a frame having a platform support, a drive support, an electronic sensing assembly and a rejecting means operably connected to said frame to thereby cooperate and form said unit, wherein:
  a. said frame supports said drive support between said platform support and said electronic sensing assembly;
  b. said platform support holds at least one power source for supplying motive power to said unit;
  c. said drive support includes a conveying mechanism, an input assembly electronically connected to said electronic sensing assembly, and a holding mechanism for holding said at least one can in position to be tested;
  d. said conveying mechanism includes a feeding means to direct said at least one can into said input assembly of said unit;
  e. said conveying mechanism further includes a rotational means means for moving said at least one can longitudinally and rotationally past said input assembly;
  f. said input assembly feeds information regarding said defective can to said electronic sensing assembly;
  g. said electronic sensing assembly activates said rejecting means upon indication from said input assembly that said defective can is present in said production system and thereby forces said defective can out of said production system;
  h. said conveying means includes an inside chain and an outside chain oppositely disposed from and parallel to said inside chain, said inside chain rotates in a direction opposite to that of said outside chain in contact with an end of said at least one can;
  i. said outside chain has a greater velocity than said inside chain;
  j. said feeding means includes a gate valve to space said at least one can for periodic entry into said electronic sensing assembly;
  k. said inside chain is rotating from said electronic sensing assembly toward said gate valve;
  l. said outside chain rotates in a direction from said gate valve to said input assembly thereby causing said at least one can to rotate thereby exposing an end of said at least one can to said input assembly, said at least one can end rotating about a vertical can axis at least twice while passing said input assembly;
  m. a lower holding means is situated between said inside chain and said outside chain for holding said at least one can in a downward direction; and
  n. a side holding means for holding said at least one can close to said input assembly is situated adjacent to said outside chain;
  o. said lower holding means includes a magnet situated between said chain whereby the magnet holds said at least one can in a downward direction so that the sensing assembly can accurately sense the defect of said at least one can.
  p. said side holding means includes a brush positioned substantially along the entire length of the input assembly so that the sensing assembly can accurately sense the defect of said at least one can;
  q. a can rejecting means is situated adjacent to said input assembly and oppositely disposed from said gate valve;
  r. said input assembly is electronically connected to said electronic sensing assembly and feeds information on said defective can thereto;
  s. said rejecting means is electronically connected to said electronic sensing assembly and activated thereby based on information fed to said electronic sensing assembly by said input assembly;
  t. said power source includes an outer motor and an inner motor secured thereto;
  u. said outer motor is operably connected to drive said outside chain; and
  v. said inner motor is operably connected to drive said inside chain.

14. The testing unit of claim 13 wherein:
  a. an outer motor belt operably connects said outer motor said to said outside chain;
  b. an inner motor belt operably connects said inner motor said to said inside chain;
  c. said gate valve is star-shaped;
  d. said star-shaped gate valve has at least one arc in an edge thereof to receive said at least one can, and direct said at least one can through said input assembly;
  e. an adjusting means for said outer rail includes a locking means and a rail adjusting means;
  f. said adjusting means for said outer rail requires release of said locking means to be adjusted properly and setting of said locking means to fix a position of said adjusting means for said outer rail;
  g. said input assembly includes an inner sensor bank adjacent said inside chain and an outer sensor bank adjacent said outside chain;
  h. said inner sensor bank includes a sensor adjusting means for positioning said inner sensor sensor bank adjacent to said at least one can;
  i. said adjusting means for said outer rail serves to position said at least one can adjacent said outer sensors;
  j. said input assembly is electronically connected to sensing mechanism and a computer contained therein capable of interpreting data and activating said rejecting means
  k. said gate valve positions said at least one can to be read by said input assembly and
  l. said rejecting means is selectively activated to reject said defective can.

15. The testing unit of claim 14 wherein:
  a. said testing unit includes a first unit for testing a first end of said at least one can and a second unit for testing a second end of said at least one can;
  b. an inverting means connects said first unit to said second unit and rotates said at least one can 180° about its horizontal axis into said second unit for testing said second end of said at least one can;
  c. said second unit is positioned lower than said first unit so that gravity and momentum of said at least one can from said first unit into said inverting means causes efficient rotation of said at least one can about its horizontal axis, so that a second end of said at least one can is presented to said second unit;
d. said second unit is similar but lower than said first unit
e. said inverting means includes a plurality of bars shaped in the form of an open tube twister to receive said at least one can at a first tube end thereof from said first unit; and
f. said inverting means is connected at a second tube end thereof to said second end unit.

16. A unit for testing a can having a first test unit and a second test unit similar to said first test unit wherein each of said first test unit and said second test unit includes a frame, a platform, a drive support, and a sensing mechanism operably connected to cooperate and form said unit, and further wherein:
a. said frame supports said platform, said drive support, and said sensing mechanism;
b. said frame includes a platform support means for holding said platform and a drive support means for holding said drive support;
c. said platform support means positions said platform, and said drive support means positions said drive support;
d. said platform support means includes said sensing mechanism and a conveying means for moving said at least one can past said sensing mechanism;
e. said conveying means includes an inside chain and an outside chain oppositely disposed from and parallel to said inside chain, said inside chain rotates in a direction opposite to that of said outside chain in contact with an end of said at least one can;
f. said outside chain has a greater velocity than said inside chain;
g. said inside chain is rotating from said sensing mechanism toward a gate valve;
h. said gate valve spaces said at least one can for periodic entry into said sensing mechanism;
i. said outise chain rotates in a direction from said gate valve to through said sensing mechanism thereby causing said at least one can to rotate thereby exposing an end of said at least one can to said sensing mechanism, said can end rotating at least twice while passing said sensing mechanism;
j. a lower holding means between said chains for holding said at least one can in a downward direction;
k. said lower holding means includes a magnet situated between said chains, whereby the magnet holds said at least one can in a downward direction so that the sensing mechanism can accurately sense the end of said at least one can;
l. a side holding means for holding said at least one can close to said sensing mechanism;
m. said side holding means is a brush positioned substantially along the entire length of the sensing mechanism so that the sensing mechanism can accurately sense the end of said at least one can;
n. a can rejection means situated adjacent said sensing mechanism for rejecting said defective can determined by said sensing mechanism to be unsuitable; said rejection means being electronically connected to said sensing mechanism and activated thereby;
o. said support means includes a set of four legs being suitably spaced to support said platform on a floor;
p. said support means is situated and secured to said legs between said floor and said platform;
q. said drive support supports a pair of power sources; a first power source of said pair is operably connected to said outside chain; a second power source of said pair being operably connected to said inside chain; said first power source and said second power source are electric motors having variable rates of speed; a speed of said first chain being at least twice that of said second chain;
r. a twisting means is adjacent said rejection means and oppositely disposed from said sensing mechanism, said twisting means serving to rotate said at least one can 180° so that a second sealed end is exposed to testing, said twisting means being mechanically connected between said first test unit at a first end thereof and to said second test unit at a second other end whereby said at least one can is fed from said first test unit into said second test unit, so that both ends of said at least one can become tested.

* * * * *